(12) United States Patent
Oh et al.

(10) Patent No.: US 9,501,703 B2
(45) Date of Patent: Nov. 22, 2016

(54) APPARATUS AND METHOD FOR RECOGNIZING TRAFFIC SIGN BOARD

(71) Applicant: HYUNDAI MOBIS Co., Ltd, Yongin-si (KR)

(72) Inventors: Huen Oh, Yongin-si (KR); Hye Ran Byun, Seoul (KR); Tae Woo Lee, Seoul (KR); Kwang Yong Lim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 14 days.

(21) Appl. No.: 14/332,084

(22) Filed: Jul. 15, 2014

(65) Prior Publication Data
US 2015/0193663 A1 Jul. 9, 2015

(30) Foreign Application Priority Data
Jan. 6, 2014 (KR) .................. 10-2014-0001006

(51) Int. Cl.
  G06K 9/00 (2006.01)
  G06K 9/56 (2006.01)
  G06K 9/62 (2006.01)
  G06K 9/46 (2006.01)

(52) U.S. Cl.
  CPC ............ G06K 9/00818 (2013.01); G06K 9/56 (2013.01); G06K 9/6257 (2013.01); G06K 2009/4666 (2013.01)

(58) Field of Classification Search
None
See application file for complete search history.

(56) References Cited

U.S. PATENT DOCUMENTS

| | | | |
|---|---|---|---|
| 5,184,216 A * | 2/1993 | Kobayashi | G06T 7/2013 348/207.99 |
| 8,254,715 B2 | 8/2012 | Cho et al. | |
| 8,687,855 B2 * | 4/2014 | Woo | G06K 9/00248 382/118 |
| 2009/0304285 A1 * | 12/2009 | Wu | G06K 9/4633 382/199 |
| 2010/0188288 A1 * | 7/2010 | Bahlmann | B60W 30/146 342/357.23 |
| 2012/0057756 A1 * | 3/2012 | Yoon | G06K 9/6256 382/104 |
| 2012/0162429 A1 * | 6/2012 | Wuerz-Wessel | G06K 9/6228 348/148 |
| 2014/0180977 A1 * | 6/2014 | Cosatto | G06N 99/005 706/12 |
| 2014/0294291 A1 * | 10/2014 | Zhang | G06K 9/00818 382/159 |

FOREIGN PATENT DOCUMENTS

| | | |
|---|---|---|
| KR | 10-2011-0051714 A | 5/2011 |
| KR | 10-2012/0020008 A | 3/2012 |
| KR | 10-2013-0052333 A | 5/2013 |

OTHER PUBLICATIONS

Fröba, Bernhard, and Andreas Ernst. "Face detection with the modified census transform." Automatic Face and Gesture Recognition, 2004. Proceedings. Sixth IEEE International Conference on. IEEE, 2004.*

(Continued)

Primary Examiner — Michelle Entezari
(74) Attorney, Agent, or Firm — NSIP Law

(57) ABSTRACT

A method and apparatus for detecting and recognizing a traffic sign using a modified census transform (MCT) feature are disclosed. The traffic sign recognizing method according to an exemplary embodiment of the present invention includes detecting a traffic sign candidate region from an input image using a modified census transform (MCT) feature; verifying whether the candidate region corresponds to a traffic sign using the MCT feature histogram for the candidate region; and lassifying a region of interest into the corresponding traffic sign step by step using the MCT feature histogram for the verified candidate region.

21 Claims, 10 Drawing Sheets

(56) References Cited

OTHER PUBLICATIONS

Lee, Younghyun, et al. "License plate detection using local structure patterns." Advanced Video and Signal Based Surveillance (AVSS), 2010 Seventh IEEE International Conference on. IEEE, 2010.*

Du, Shan, et al. "Automatic license plate recognition (ALPR): A state-of-the-art review." Circuits and Systems for Video Technology, IEEE Transactions on 23.2 (2013): 311-325.*

Artan, Yusuf, et al. "Efficient smqt features for snow-based classification on face detection and character recognition tasks." Image Processing Workshop (WNYIPW), 2012 Western New York. IEEE, 2012.*

Rodriguez, Yann, and Sébastien Marcel. "Face authentication using adapted local binary pattern histograms." Computer Vision—ECCV 2006. Springer Berlin Heidelberg, 2006. 321-332.*

Bai, Li, Linlin Shen, and Yan Wang. "A novel eye location algorithm based on radial symmetry transform." Pattern Recognition, 2006. ICPR 2006. 18th International Conference on. vol. 3. IEEE, 2006.*

Cheng, Yue, Jiaiuning Lu, and Takashi Yahagi. "Car license plate recognition based on the combination of principal components analysis and radial basis function networks." Signal Processing, 2004. Proceedings. ICSP'04. 2004 7th International Conference on. vol. 2. IEEE, 2004.*

Wu, Ming-Kan, et al. "License plate detection based on 2-level 2D Haar wavelet transform and edge density verification." Industrial Electronics, 2009. ISIE 2009. IEEE International Symposium on. IEEE, 2009.*

Ruiz-Hernandez, John A., et al. "Face Recognition using Tensors of Census Transform Histograms from Gaussian Features Maps." *BMVC.* 2009. (12 pages, in English).

Wu, Jianxin, and James M. Rehg. "CENTRIST: A visual descriptor for scene categorization." *Pattern Analysis and Machine Intelligence, IEEE Transactions on* 33.8 (2011): 1489-1501. (14 pages, in English).

Lee, Young-Hyun, et al. "License Plate Detection with Improved Adaboost Learning based on Newton's Optimization and MCT." *Journal of the Korea Society of Computer and Information* vol. 17 No. 12 (Dec. 2012). 73-84 (12 Pages in Korean).

Hanxizi, Zhang, et al. "A novel detection and recognition system for Chinese traffic signs." *Control Conference (CCC), 2013 32nd Chinese.* IEEE, 2013. (6 pages, in English).

* cited by examiner

APPARATUS AND METHOD FOR RECOGNIZING TRAFFIC SIGN BOARD

CROSS-REFERENCE TO RELATED APPLICATIONS

This application claims priority under 35 U.S.C. §119 to Korean Patent Application No. 10-2014-0001006, filed on Jan. 6, 2014, in the Korean Intellectual Property Office, the disclosure of which is incorporated herein by reference in its entirety.

TECHNICAL FIELD

The present invention relates to a method and apparatus for recognizing a traffic sign and more particularly, to a method and apparatus for detecting and recognizing a traffic sign using a modified census transform (MCT) feature.

BACKGROUND

As vehicles are generally used to move along a road, a traffic sign which provides information required for a driver to drive a car safely and smoothly is provided on the road.

Generally, a traffic information sign, a road sign, a weather information status board, an atmospheric pollution status board, a car accident status board, a municipal governmental information board, and an advertising board may be provided depending on the type of traffic signs.

Recently, it is necessary to take into consideration of the increased amount of a driver having a poor eye sight or an aged driver and as a result, the necessity of developing a safe driving assistance system which exactly transmits information of a traffic sign is increased.

In order to develop an intelligent unmanned vehicle, development of a vision based traffic sign recognizing system is also required and thus an interest in a traffic sign detecting and recognizing model is now the focus.

However, in the traffic sign detecting model of the related art, due to change in climate and an illumination, blurring of an image caused by movement of a vehicle in which a camera is mounted, sudden color contrast change, and shape change when the traffic sign is blocked or inclined, a performance for detecting the traffic sign is poor.

Specifically, the technique of detecting a traffic sign of the related art processes an image which is input through a pre-processing process once and then uses feature information based on a color and a shape. Here, the pre-treatment process requires an additional operation, which delays a detecting and recognizing speed and a detecting performance of a detecting technology using color is lowered when the illumination is changed and a colored paint is discolored. Further, when an operational amount of a detecting technology using a shape is large, real time detection is difficult and when the operational amount is small, detection accuracy is lowered.

SUMMARY

The present invention has been made in an effort to provide a technology which uses a modified census transform (MCT) feature as a feature vector for detecting and recognizing a traffic sign so that no pre-treatment process is required, thereby improving a detecting and recognizing speed.

The present invention has been made in an effort to further provide a method and apparatus for recognizing a traffic sign with an improved recognizing performance which generate an MCT feature histogram from different image regions for every level to classify the traffic sign.

The object of the present invention is not limited to the aforementioned matters, and those skilled in the art will clearly understand non-mentioned other objects through the following description.

An aspect of the present invention provides a traffic sign recognizing method including: detecting a traffic sign candidate region from an input image using a modified census transform (MCT) feature; verifying whether the candidate region corresponds to a traffic sign using the MCT feature histogram for the candidate region; and classifying a region of interest into the corresponding traffic sign step by step using the MCT feature histogram for the verified candidate region (hereinafter, referred to as a region of interest).

According to an exemplary embodiment of the present invention, the detecting of a candidate region may include: extracting the MCT feature for every pixel of the input image using the pixel value of the input image; and classifying the candidate region from the input image using a classifier in which an MCT feature for the traffic sign is trained using at least one of an AdaBoost algorithm and a cascade algorithm.

According to an exemplary embodiment of the present invention, the verifying may include: creating an MCT feature histogram for an MCT feature value and a frequency of the value using the MCT feature for each pixel of the candidate region; and verifying the MCT feature histogram of the input image using a classifier in which the MCT feature histogram for the traffic sign is trained.

According to an exemplary embodiment of the present invention, the recognizing of a traffic sign may include matching the region of interest using a radial symmetry detection (RSD).

According to an exemplary embodiment of the present invention, the recognizing of a traffic sign may include classifying the region of interest as the traffic sign using a traffic sign to be classified for every level and a multilevel classification tree which defines a region of the region of interest in which an MCT feature histogram is created.

According to an exemplary embodiment of the present invention, the recognizing of a traffic sign may include creating a first MCT feature histogram in a first region of the region of interest in an N-th level and a second MCT feature histogram in a second region of the region of interest in an N+1-th level.

According to an exemplary embodiment of the present invention, the recognizing of a traffic sign may include a first step of classifying the region of interest into a speed sign and other signs; and a second step of classifying the speed sign as the corresponding speed sign or the other signs as the other sign and non-recognized target signs.

Another aspect of the present invention provides a traffic sign recognizing apparatus including: one or more processors and a nonvolatile memory in which a code which is executed by the processor is stored, in which the processor is configured to detect a traffic sign candidate region from an input image using a modified census transform (MCT) feature; verify whether the candidate region corresponds to a traffic sign using the MCT feature histogram for the candidate region; and classify a region of interest into the corresponding traffic sign step by step using the MCT feature histogram for the verified candidate region (hereinafter, referred to as a region of interest).

In the meantime, a program which implements the traffic signal recognizing method according to the aspect of the present invention described above may be recorded in a computer readable recording medium.

According to the present invention, the modified census transform (MCT) feature is used as a feature vector for detecting and recognizing a traffic sign so that no pre-treatment process is required, which may improve a detecting and recognizing speed.

The MCT feature histogram is generated from different image regions for every level to classify the traffic sign, which may improve a recognizing performance.

DETAILED DESCRIPTION OF EMBODIMENTS

Figure 1:
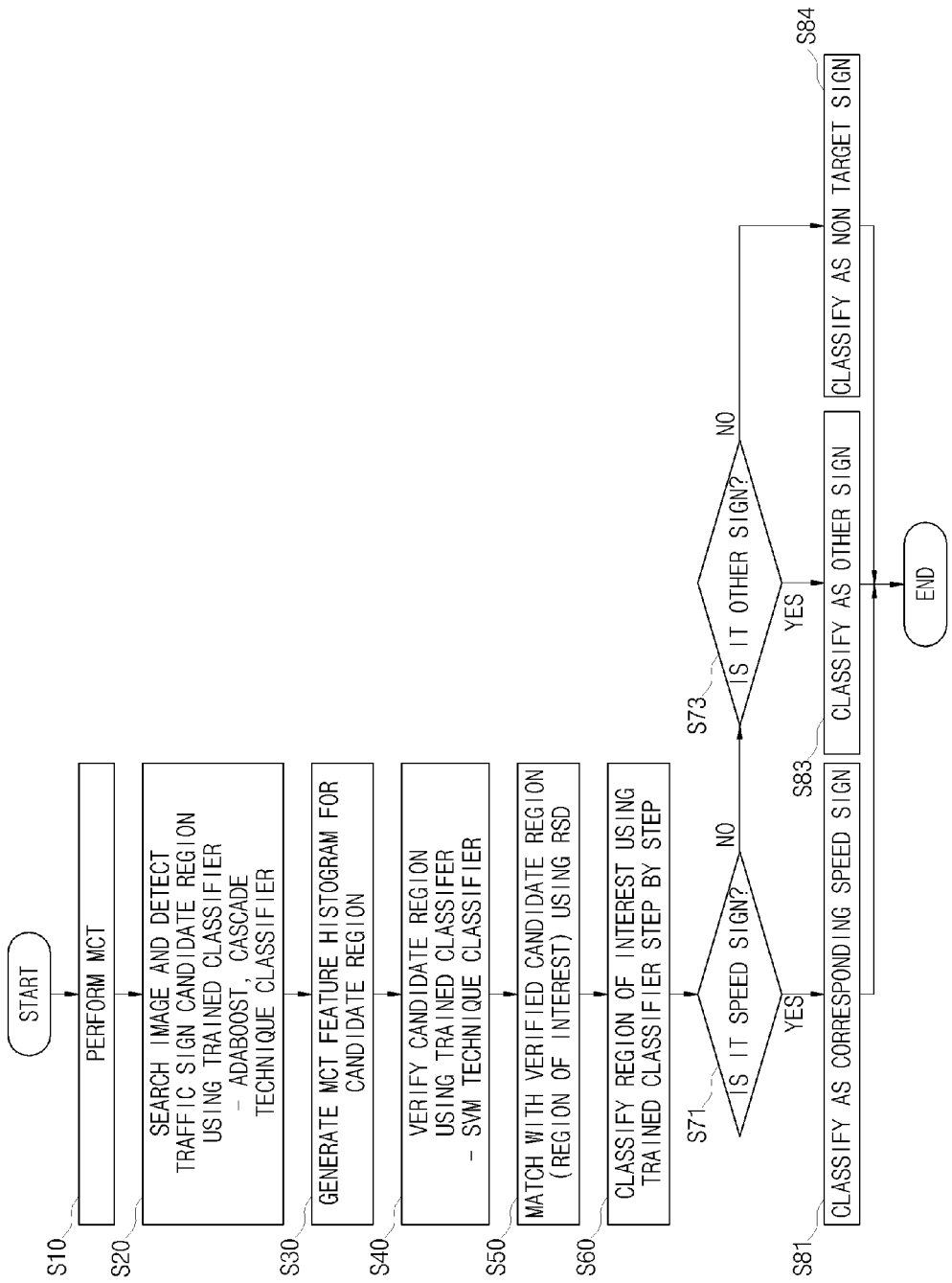
FIG. 1 is a view illustrating a traffic sign recognizing method according to an exemplary embodiment of the present invention.

Advantages and characteristics of the present invention and a method of achieving the advantages and characteristics will be clear by referring to exemplary embodiments described below in detail together with the accompanying drawings. However, the present invention is not limited to exemplary embodiment disclosed herein but will be implemented in various forms. The exemplary embodiments are provided only to make disclosed contents thorough and complete and sufficiently transfer the spirit of the present invention to those skilled in the art. Therefore, the present invention will be defined by the description of the claims. Meanwhile, terminologies used in the present invention are to explain exemplary embodiments rather than limiting the present invention. Unless particularly stated otherwise in the present specification, a singular form also includes a plural form. The word "comprises" or "comprising" used in the present specification will be understood to imply the inclusion of stated constituents, steps, operations and/or elements but not the exclusion of any other constituents, steps, operations and/or elements.

Hereinafter, exemplary embodiments of the present invention will be described in detail with reference to the accompanying drawings. In the drawings, like components are denoted by like reference numerals if possible even though the components are illustrated in different drawings and when it is judged that specific description on known configurations or functions related in the description of the present invention may unnecessarily obscure the essentials of the present invention, the detailed description will be omitted.

The traffic sign recognizing method according to an exemplary embodiment of the present invention includes detecting traffic sign candidate regions from an input image; verifying whether the candidate regions correspond to traffic signs; and classifying and recognizing the verified candidate region (hereinafter, referred to as a region of interest) as the corresponding traffic sign.

In the above-described traffic sign recognizing method, a local binary pattern called a modified census transform (MCT) is commonly used as feature information. In all of the detecting process, the verifying process, and the recognizing process, the MCT feature is commonly used so that the input image needs to be converted only once.

As described above, the traffic sign recognizing method according to an exemplary embodiment of the present invention commonly uses the MCT feature in entire processes without performing a separate pre-treatment process so that an operational amount is reduced. Hereinafter, the traffic sign detecting, verifying, and recognizing steps described above will be specifically described with reference to FIG. 1.

FIG. 1 is a view illustrating a traffic sign recognizing method according to an exemplary embodiment of the present invention.

In step S10, a traffic sign recognizing apparatus performs MCT on an input image obtained by capturing a traffic sign. The MCT is to extract a feature descriptor which is used to detect an object and as a result of the MCT, the feature descriptor (hereinafter, referred to as an MCT feature) may be calculated in the unit of pixel from the input image.

Figure 2:
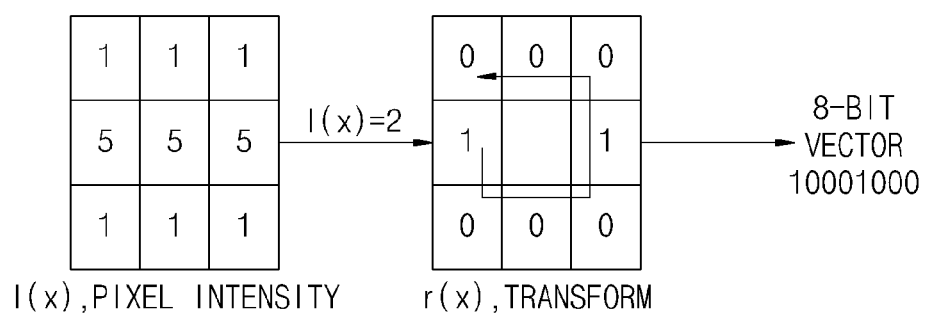
FIG. 2 is a view explaining an MCT technique in an exemplary embodiment of the present invention.

FIG. 2 illustrates a process of performing the MCT on the input image. As illustrated in FIG. 2, in order to perform the MCT, a kernel window having a predetermined size (for example, 3×3) is designated with respect to a pixel to be transformed. In this case, it is assumed that the pixel to be transformed and pixels which are included in the kernel window have corresponding pixel values. Next, an average of the pixels included in the kernel window is compared with individual pixel values and nine-digit bit is calculated such that if the pixel value of the corresponding pixel is larger than the average, a value is given as 1 and if the pixel value of the corresponding pixel is smaller than the average, a value is given as 0.

In this exemplary embodiment of the present invention, binary-coded result values for remaining pixels other than the pixel value of the pixel to be transformed are used to calculate total eight digit bits and as a result, a decimal feature vector (or a feature descriptor) having a total of 256 dimensions of 0 to 255 may be calculated. In this case, the MCT feature is desirably calculated for all pixels of the input image.

In step S20, the traffic sign recognizing apparatus uses the MCT feature extracted from the input image and a classifier in which the MCT feature for the traffic sign is trained to detect a traffic sign candidate region from the input image.

To this end, according to a specific embodiment, the traffic sign recognizing apparatus uses the MCT feature to search an input image. In this case, the traffic sign recognizing apparatus uses a classifier in which the MCT feature for the traffic sign is trained.

In order to detect an object including feature descriptors, object detecting methods using an image clustering technique and machine learning methods may be utilized. In this case, a spatial frequency characteristic, uniformity, continuity, color information, and depth information in the image signal may be utilized. According to an exemplary embodiment of the present invention, a classifier in which the MCT feature for the traffic sign is trained using the machine learning method is used to detect the traffic sign.

In the meantime, as the machine learning method which learns the MCT feature, an AdaBoost learning technique and a cascade learning technique may be used. In the exemplary embodiment of the present invention, only any one of two learning techniques described above is used or both learning techniques are used to improve a learning performance. Hereinafter, the above-mentioned learning techniques will be described with reference to FIGS. 3 and 4.

AdaBoost

Figure 3:
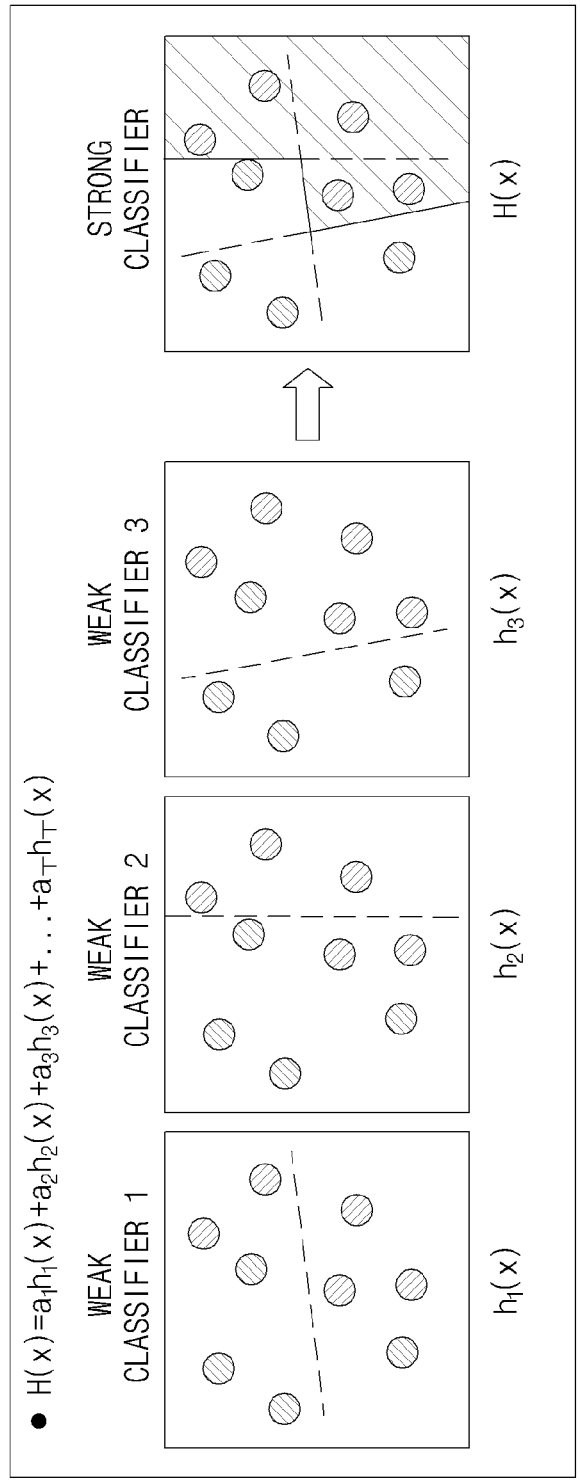
FIG. 3 is a view explaining an AdaBoost classification technique in an exemplary embodiment of the present invention.

The AdaBoost technique is a technique which creates an effective classifier when there are lots of features. When a size of the traffic sign in the input image is 40×40, one MCT feature for every pixel excluding 1 pixels at the border, that is, 1,444 (38×38) MCT features in total are provided. According to the AdaBoost technique, a weight is differently assigned depending on an importance of the pixel and when a partial image is input, a reference of the pixel and the weight are operated to classify whether the partial image is the traffic sign. If each pixel is defined as one weak classifier, as illustrated in FIG. 3, several weak classifiers are combined with a predetermined weight to create a precise strong classifier.

Cascade

Figure 4:
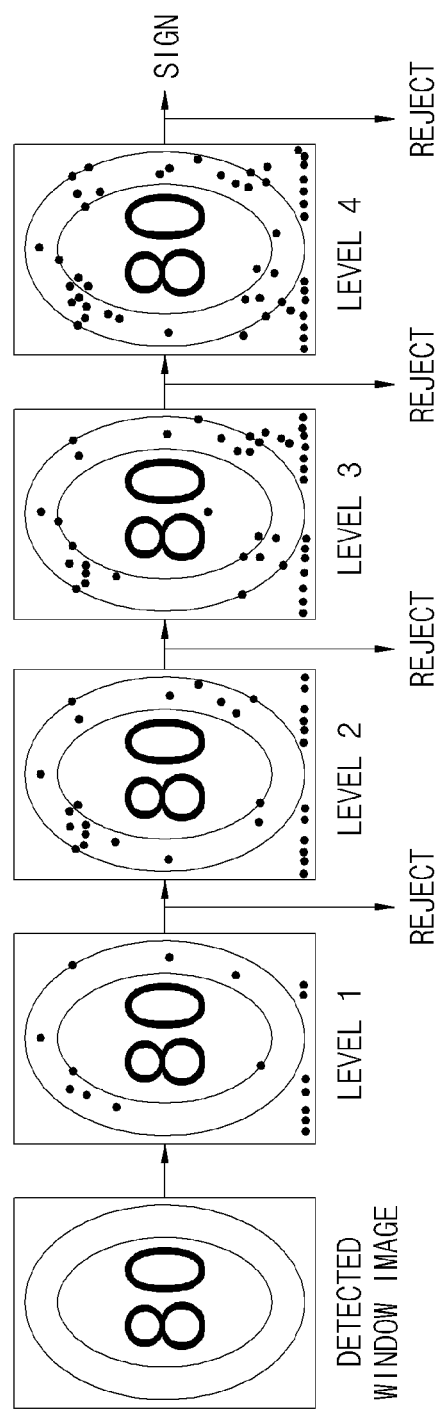
FIG. 4 is a view explaining a cascade classification technique in an exemplary embodiment of the present invention.

The cascade technique is a technique which improves a detection speed. When the MCT features (1,444 features in the case of 40×40) for every pixel of the input image are compared with the trained MCT feature in order to detect the traffic sign in the image, a large operational amount is consumed. In order to solve the above problem, multi-level classification is performed with a small number of MCT features having an excellent discernment performance for a background and the traffic sign. For example, the detection is performed using 20 MCT features in a first level, 40 MCT features in a second level, 60 MCT features in a third level, and 80 MCT features in a fourth level, which may significantly reduce the operational amount. FIG. 4 illustrates a classification process in four levels and MCT feature pixels which are selected as a major feature for every level.

In step S30, the traffic sign recognizing apparatus creates an MCT feature histogram for every detected candidate region. This is a step of extracting a new feature descriptor to verify whether the detected traffic sign candidate region corresponds to an actual traffic sign.

The MCT feature histogram means frequency distribution of values of the MCT features extracted from all pixels which belong to the candidate region and is a two-dimensional feature descriptor including a MCT feature value dimension and a frequency dimension of the MCT feature value.

Figure 5:
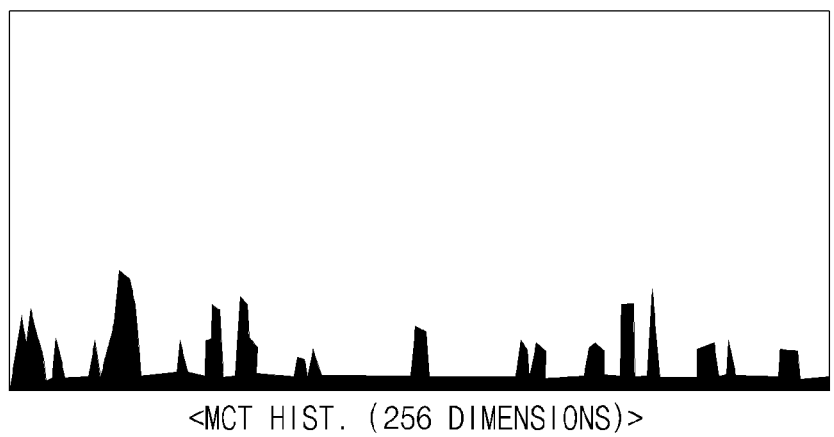
FIG. 5 is a view explaining an example in which an MCT feature histogram is generated in an exemplary embodiment of the present invention.

For example, when it is assumed that the MCT feature has an eight-digit binary value, a total of 256 bins are created to create a histogram. That is, a result of analyzing how many times 0 to 255 values which may be represented as the MCT feature appear in the candidate region is used for the verification. If the MCT feature value is 00000001 (binary number), that is, 1 (decimal number), in one pixel, 1 is added to a first bin. If the MCT feature value is 00000111 (binary number), that is, 7 (decimal number), in a next pixel, 1 is added to a seventh bin. The histogram created as described above becomes one feature vector having a total of 256 dimensions. In the exemplary embodiment of the present invention, an MCT feature histogram having 255 dimensions excluding meaningless zero-th bin is desirably used. FIG. 5 illustrates an example of the MCT feature histogram.

In step S40, the traffic sign recognizing apparatus uses a classifier in which the MCT feature histogram for a traffic sign is trained with the MCT feature histogram which is extracted from the candidate region as a feature vector, thereby verifying a candidate region.

Figure 6:
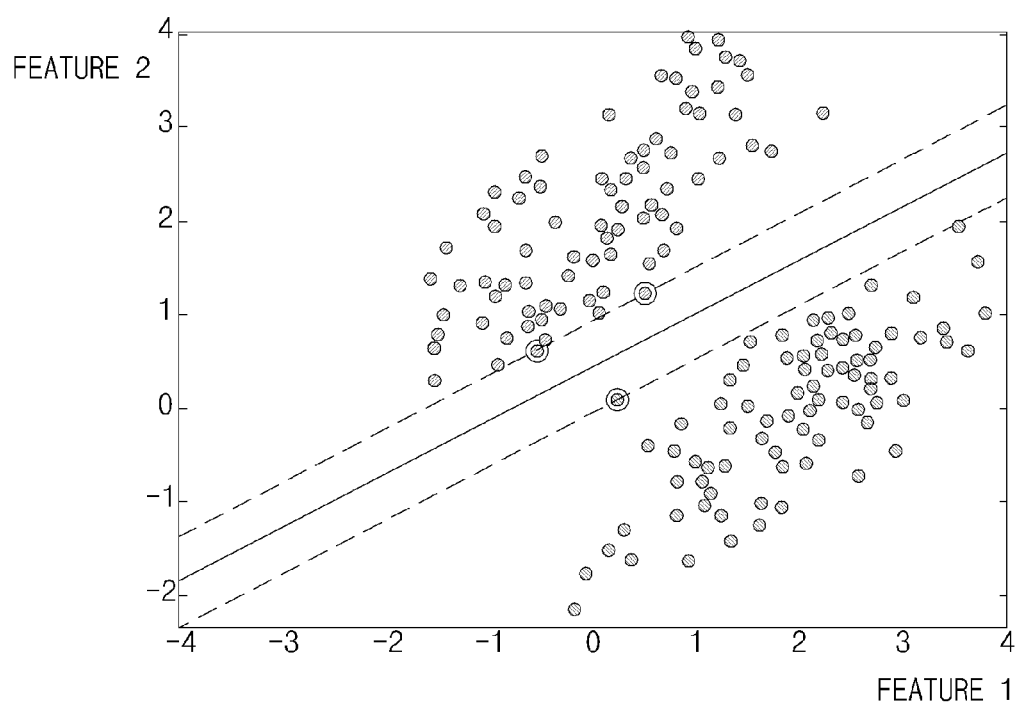
FIG. 6 is a view explaining an SVM classification technique in an exemplary embodiment of the present invention.

For example, the classifier may train the MCT feature histogram for a traffic sign using a support vector machine (SVM) learning technique. FIG. 6 illustrates an example of an operation of the SVM classifier.

The SVM learning technique is a technique which, when data is configured by two classes, finds out a classifier which the most distinguishes the two classes. The SVM which is used during the verification process classifies whether to be a sign with reference to a classifier when experimental data (for example, an MCT feature histogram extracted from the candidate range) is input after creating a classifier using the MCT feature histogram.

In step S50, the traffic sign recognizing apparatus performs a matching process to improve accuracy of recognition for a verified candidate region (hereinafter, referred to as a region of interest). For example, in the matching process, in order to precisely adjust a size and a position of a round sign, a radial symmetry detection (RSD) technique may be used.

Figure 7:
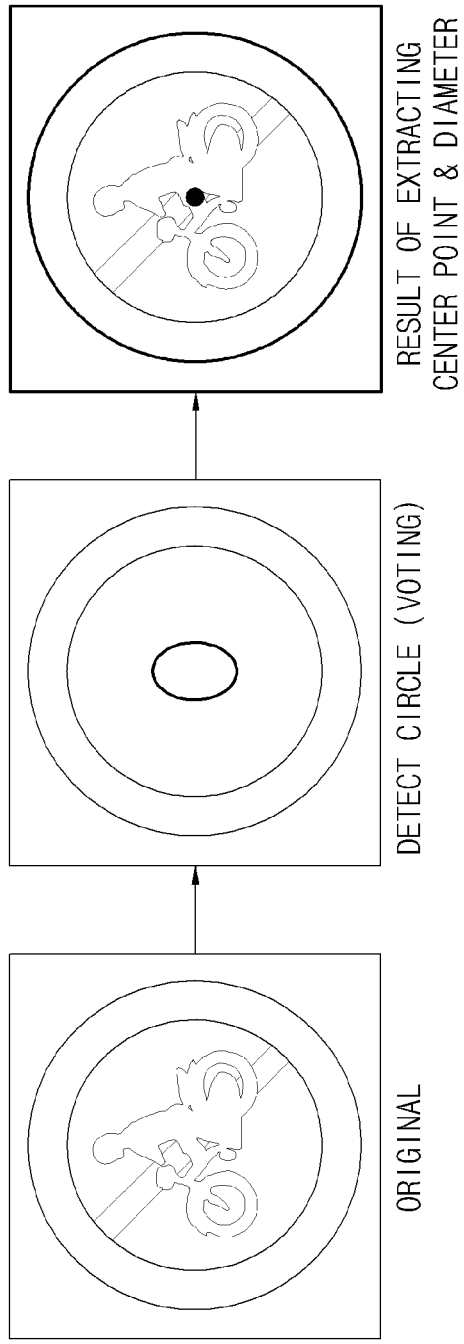
FIG. 7 is a view illustratively explaining RSD matching of a round sign in an exemplary embodiment of the present invention.

The RSD technique estimates a center point of a circle under the assumption that pixels of the region of interest are components of the circle. The center point of the circle is estimated as follows. Voting is performed in a gradient direction using a deviation between an X axis and a Y axis of each pixel and a point having the highest voted value is determined as the center point of the circle. The region of interest is matched with a rectangular region of interest having a radius, which is obtained when the center is considered as a center of the region of interest, as a half of a length corresponding to one edge thereof. FIG. 7 illustrates an example of matching of a round sign using RSD.

In step S60, the traffic sign recognizing apparatus uses the trained classifier to classify the region of interest as a corresponding traffic sign step by step. In this case, the MCT feature histogram is used as a feature descriptor for classification and an SVM classifier in which the MCT feature histogram of the traffic sign is trained using the SVM learning technique is used.

Specifically, the traffic sign recognizing apparatus classifies the region of interest into the traffic sign step by step and in this case, the traffic sign recognizing apparatus may create an MCT feature histogram in different regions of the region of interest for every level. Further, an SVM classifier in which different MCT feature histograms are trained for every level may be used.

For example, the traffic sign recognizing apparatus may create a first MCT feature histogram in a first region of the region of interest in an N-th level and create a second MCT feature histogram in a second region of the region of interest in an N+1-th level. As described above, the MCT feature histograms which are differently created for every level may have the strongest classification performance in every level.

Figure 8:
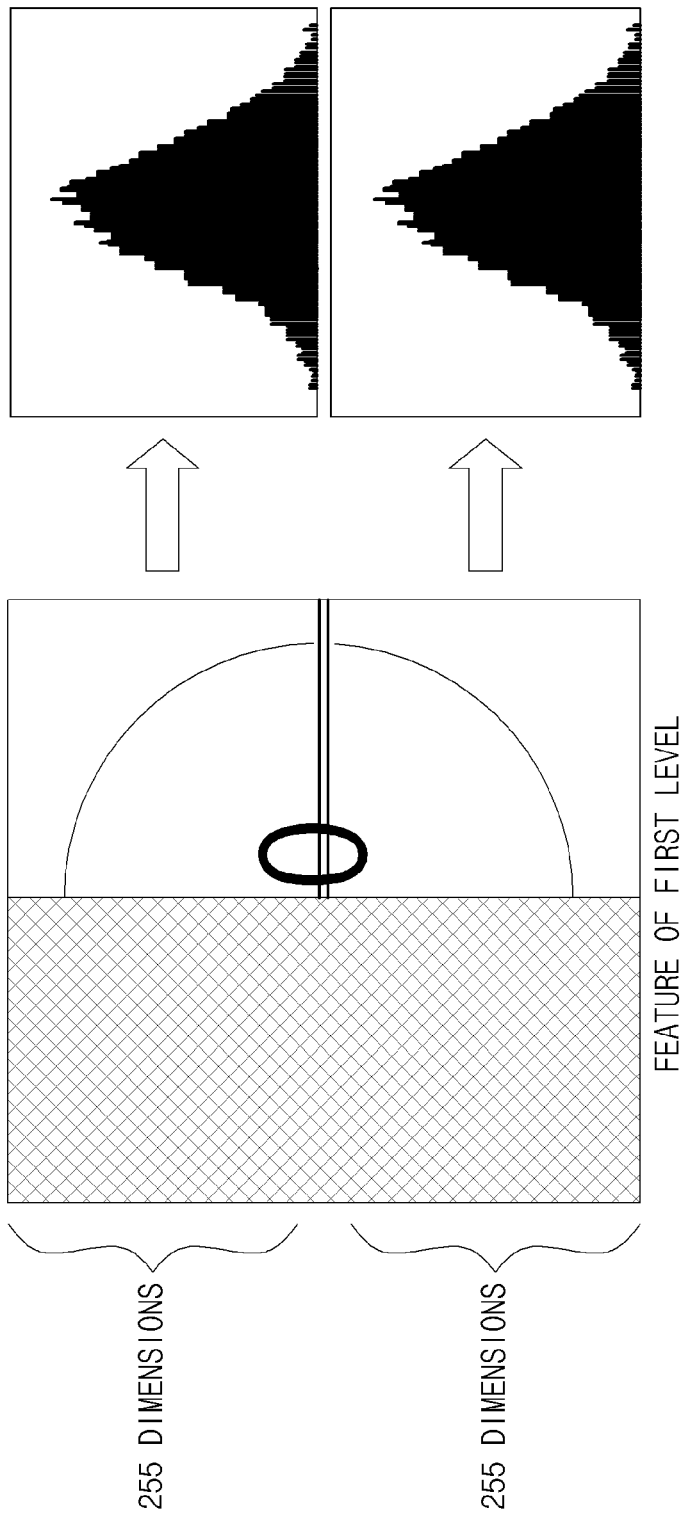
FIG. 8 is a view explaining an example in which an MCT feature histogram used in a first traffic sign recognizing step in an exemplary embodiment of the present invention is generated.

In the meantime, the traffic sign recognizing apparatus may classify the region of interest as the sign using a multilevel classification tree. Here, in the multilevel classification tree, a traffic sign which becomes a classifying target for every level and a region of the region of interest in which the MCT feature histogram is created are defined. FIG. 8 illustrates an example of an MCT feature histogram which is created in the region defined in a specific level for classifying the traffic sign and FIG. 9 illustrates an example of the multilevel classification tree.

Figure 9:
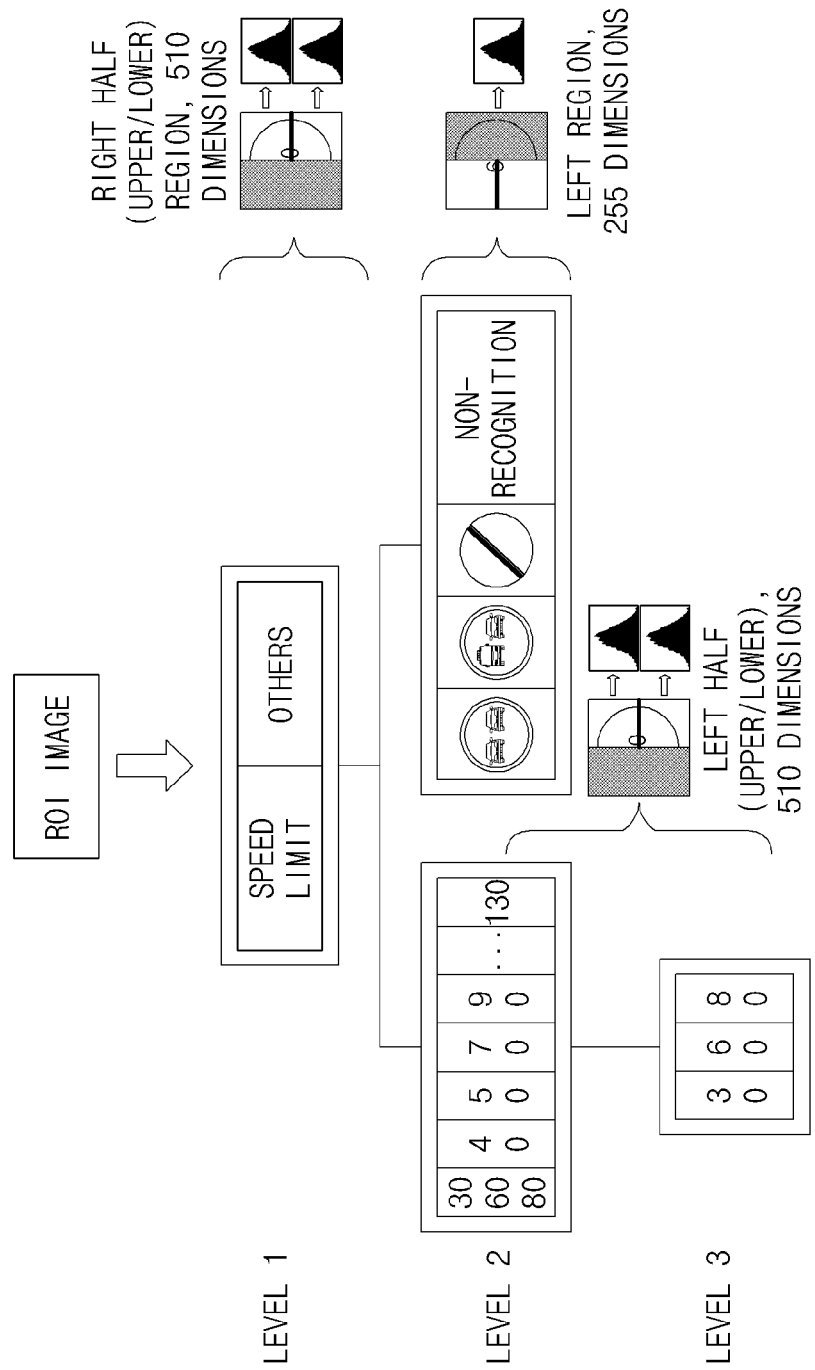
FIG. 9 is a view explaining an example of a multilevel classification tree which is used in a traffic sign recognizing step in an exemplary embodiment of the present invention.
Figure 10:
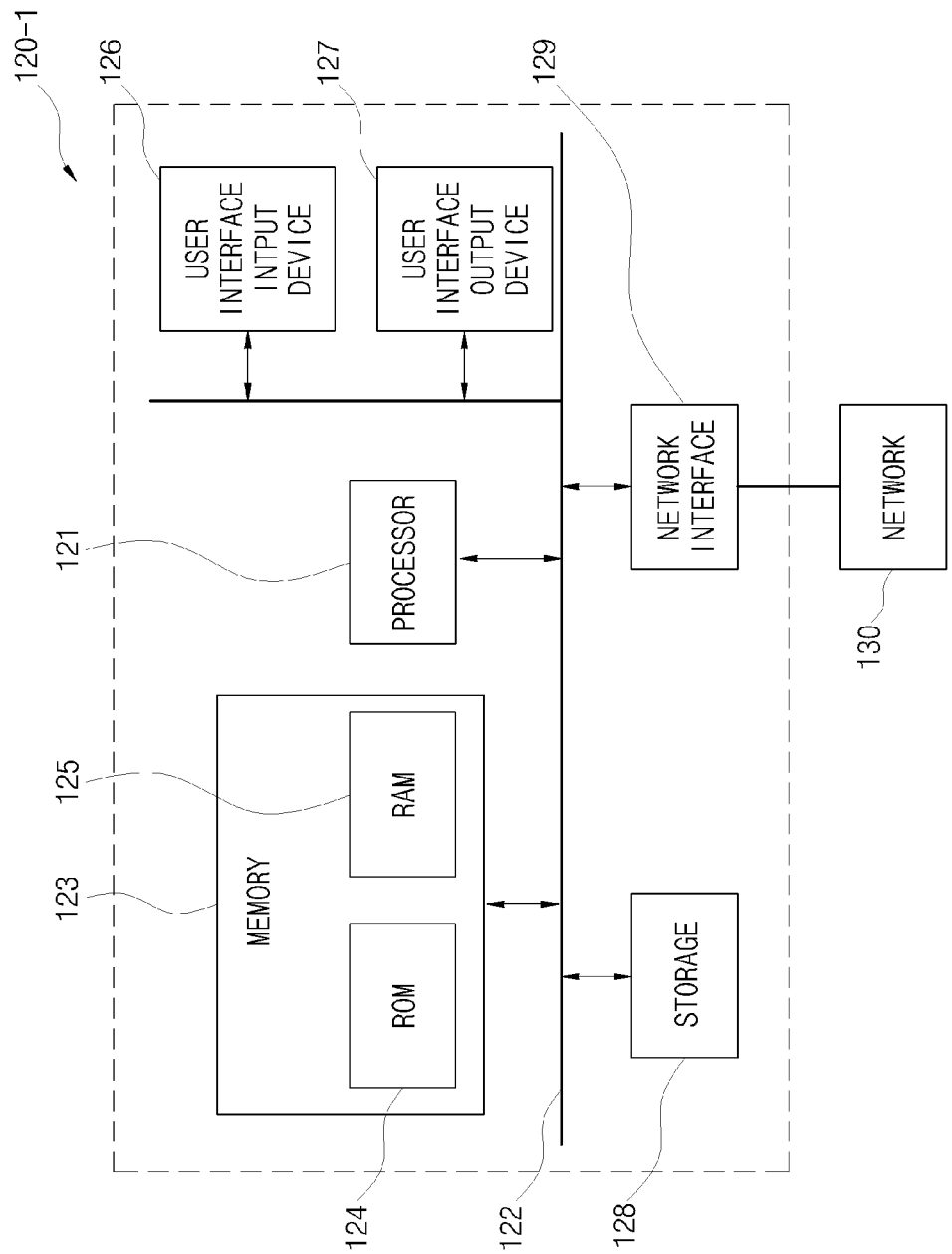
FIG. 10 is a view illustrating a configuration of a computer device in which a traffic sign recognizing method according to an exemplary embodiment of the present invention is executed.

Referring to FIG. 9, the traffic sign recognizing apparatus primarily classifies the region of interest into a speed sign and other signs in steps S71 and S73. In this case, the MCT feature histograms are created in a left half and a right half of the region of interest and the traffic sign recognizing apparatus classifies the speed sign and other signs using two MCT feature histograms (a total of 510 dimensions).

Next, the traffic sign recognizing apparatus classifies a speed sign as the corresponding speed sign in step S81 or classifies other signs into the other sign in step S83 and a non-recognized target sign in step S84. In this case, the MCT feature histogram which is generated in the left half region of the region of interest may be used.

In the meantime, the traffic sign recognizing method according to the exemplary embodiment of the present invention may be implemented in a computer system or recorded in a recording medium. As illustrated in FIG. 9, the computer system may include one or more processors 121, a memory 123, a user input device 126, a data communication bus 122, a user output device 127, and a storage 128. The above-mentioned components may perform data communication through the data communication bus 122.

The computer system may further include a network interface 129 which is coupled to a network. The processor 121 may be a central processing unit (CPU) or a semiconductor device which processes a command stored in the memory 123 and/or the storage 128.

The memory 123 and the storage 128 may include various types of volatile or nonvolatile storage media. For example, the memory 123 may include a ROM 124 and a RAM 125.

Therefore, the traffic sign recognizing method according to the exemplary embodiment of the present invention may be implemented as a method which is executable in a computer. When the traffic sign recognizing method according to the exemplary embodiment of the present invention is executed in the computer device, computer readable commands may perform the recognizing method according to the present invention.

In the meantime, the above-described traffic sign recognizing method according to the present invention may be implemented as a computer readable code in a computer readable recording medium. The recording medium which is capable of being read by computer includes all kinds of recording media in which data, which are capable of being read by a computer system, are stored. For example, the recording medium may include a read only memory (ROM), a random access memory (RAM), a magnetic tape, a magnetic disk, a flash memory, and an optical data storage device. Further, the computer readable recording medium may be distributed into computer systems which are connected through a computer communication network to be stored and executed as a code which is readable by a distribution method.

The configuration of the present invention has been described in detail with reference to the exemplary embodiment of the present invention, but those skilled in the art will understand that the present disclosure may be implemented in another specific form without changing the technical spirit or an essential feature of the present invention. Thus, it is to be appreciated that embodiments described above are intended to be illustrative in every sense, and not restrictive. The scope of the present invention is represented by the claims to be described below rather than the detailed description, and it is to be interpreted that the scope of the claims and all the changes or modified forms derived from the equivalents thereof are included in the scope of the present invention.

What is claimed is:

1. A traffic sign recognizing method, comprising:
   detecting a traffic sign candidate region from an input image using a modified census transform (MCT) feature;
   verifying whether the candidate region corresponds to a traffic sign using the MCT feature histogram for the candidate region;
   classifying a region of interest into the corresponding traffic sign using the MCT feature histogram for the verified candidate region; and
   matching the region of interest using a radial symmetry detection (RSD) based on voting in a gradient direction using a deviation of an X axis value and a deviation of a Y axis value of each pixel of the input image.

2. The method of claim 1, wherein the detecting of a candidate region comprises:
   designating a kernel window having a size with respect to a pixel to be transformed in the input image; and
   comparing an average of pixel values of pixels included in the kernel window with individual pixel values to calculate n digit bits of MCT feature by assigning a value of 1 to the pixel, in response to the pixel value of the corresponding pixel being larger than the average of the pixel values, and assigning a value of 0 to the pixel, in response to the pixel value of the corresponding pixel being smaller than the average.

3. The method of claim 1, wherein the detecting of a candidate region comprises:
   extracting the MCT feature for every pixel of the input image using the pixel value of the input image; and
   classifying the candidate region from the input image using a classifier in which an MCT feature for the traffic sign is trained using at least one of an AdaBoost algorithm or a cascade algorithm.

4. The method of claim 1, wherein the detecting of the candidate region comprises:
   extracting the MCT feature for every pixel of the input image using the pixel value of the input image;
   classifying n features from the extracted MCT features using a classifier in which the MCT feature for the traffic sign is trained; and
   classifying m features, excluding the n features, among remaining MCT features.

5. The method of claim 1, wherein the verifying comprises:
   creating an MCT feature histogram for an MCT feature value and a frequency of the value using the MCT feature for each pixel of the candidate region; and
   verifying the MCT feature histogram of the input image using a classifier in which the MCT feature histogram for the traffic sign is trained.

6. The method of claim 1, further comprising creating an MCT feature histogram for each of a plurality of regions within the region of interest to form a multilevel classification tree in which each level contained therein is used to classify the region of interest according to a type of traffic sign classification.

7. The method of claim 1, further comprising creating a first MCT feature histogram in a first region of the region of interest in an N-th level and a second MCT feature histogram in a second region of the region of interest in an N+1-th level.

8. The method of claim 1, further comprising:
classifying the traffic sign as a speed sign, in response to classifying the region of interest as a speed sign region, and classifying the traffic sign as a non-recognized target sign, in response to classifying the region of interest as an other sign region.

9. A traffic sign recognizing apparatus, comprising:
a processor configured to;
detect a traffic sign candidate region from an input image using a modified census transform (MCT) feature;
verify whether the candidate region corresponds to a traffic sign using the MCT feature histogram for the candidate region;
classify a region of interest into the corresponding traffic sign using the MCT feature histogram for the verified candidate region; and
match the region of interest using a radial symmetry detection (RSD) based on voting in a gradient direction using a deviation of an X axis value and a deviation of a Y axis value of each pixel of the input image.

10. The apparatus of claim 9, wherein the processor is further configured to:
designate a kernel window having a size with respect to a pixel to be transformed in the input image; and
compare an average of pixel values of pixels included in the kernel window with individual pixel values to calculate n digit bits of MCT feature by assigning a value of 1 to the pixel, in response to the pixel value of the corresponding pixel being larger than the average of the pixel values, and assigning a value of 0 to the pixel, in response to the pixel value of the corresponding pixel being smaller than the average.

11. The apparatus of claim 9, wherein the processor is further configured to:
extract the MCT feature for every pixel of the input image using the pixel value of the input image; and
classify the candidate region from the input image using a classifier in which an MCT feature for the traffic sign is trained using at least one of an AdaBoost algorithm and a cascade algorithm.

12. The apparatus of claim 9, wherein the processor is further configured to:
extract the MCT feature for every pixel of the input image using the pixel value of the input image;
classify n features from the extracted MCT features using a classifier in which the MCT feature for the traffic sign is trained as a first step; and
classify m features, excluding the n features, among remaining MCT features.

13. The apparatus of claim 9, wherein the processor is further configured to:
create an MCT feature histogram for an MCT feature value and a frequency of the value using the MCT feature for each pixel of the candidate region; and
verify the MCT feature histogram of the input image using a classifier in which the MCT feature histogram for the traffic sign is trained.

14. The apparatus of claim 9, wherein the processor is further configured to create an MCT feature histogram for each of a plurality of regions within the region of interest to form a multilevel classification tree in which each level contained therein is used to classify the region of interest according to a type of traffic sign classification.

15. The apparatus of claim 14, wherein the processor is further configured to create a first MCT feature histogram in a first region of the region of interest in an N-th level and a second MCT feature histogram in a second region of the region of interest in an N+1-th level.

16. The method of claim 2, further comprising calculating bits resulting in obtaining a decimal feature vector, based on binary-coded result values for pixels not to be transformed.

17. The method of claim 1, further comprising creating a first MCT feature histogram for a first half of the region of interest and a second MCT feature histogram for a second half of the region of interest.

18. The method of claim 1, wherein the classifying the region of interest into the corresponding traffic sign is performed step-by-step.

19. The method of claim 1, wherein the matching further comprises determining a point having a highest voted value as a center point of a circle.

20. The method of claim 19, wherein the matching further comprises matching the region of interest with a rectangular region encompassing a radius of the circle, the radius is obtained in response to the center point of the circle being considered as a center of the region of interest, and the radius is one half of a length corresponding to one edge of the region of interest.

21. A non-transitory computer-readable medium storing instructions that, when executed by one or more processors, cause the one or more processors to perform the method of claim 1.

* * * * *